July 19, 1955 G. E. WAGNER 2,713,499
LOAD BINDER CONSTRUCTION
Filed Jan. 12, 1954 2 Sheets-Sheet 1
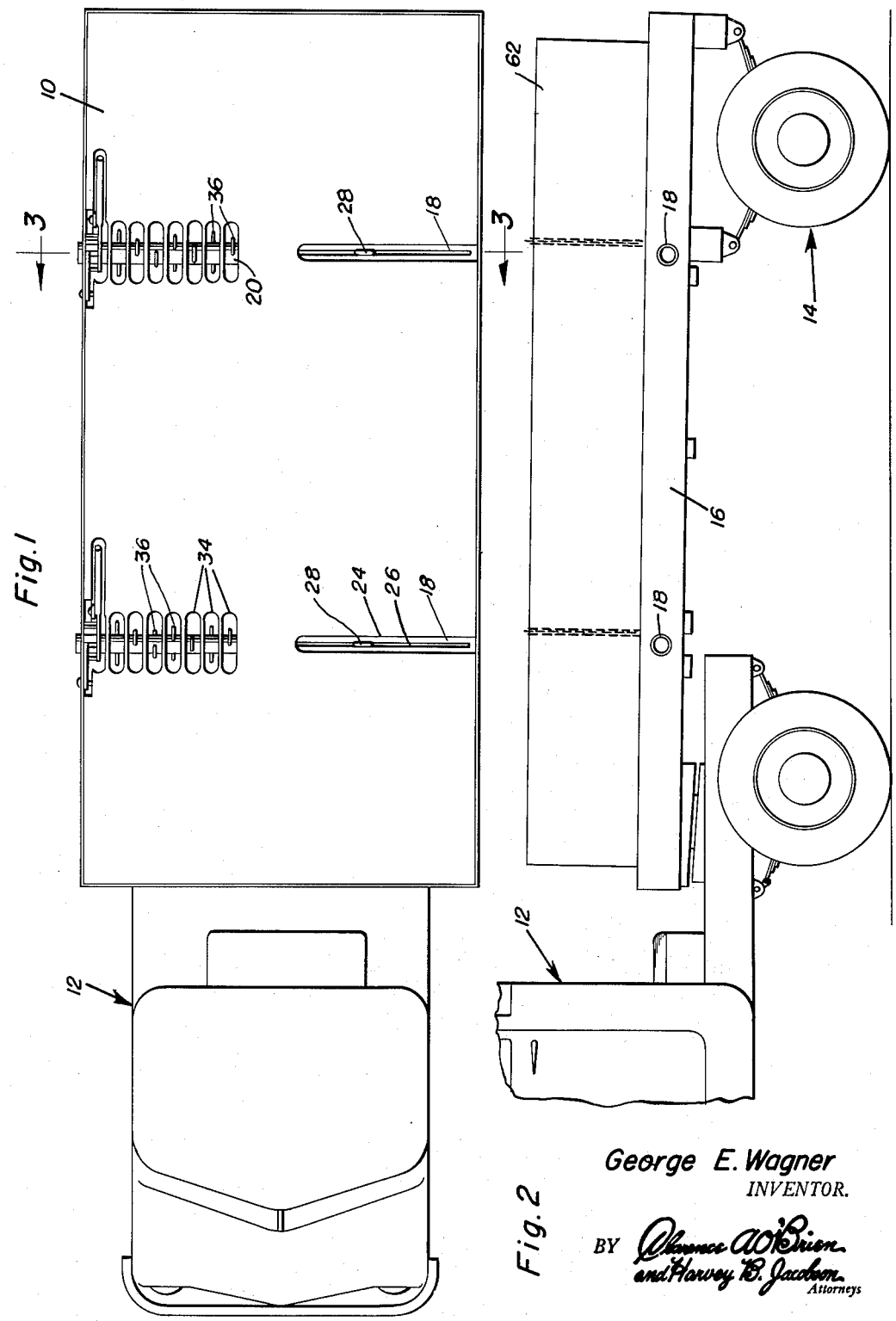
George E. Wagner
INVENTOR.

July 19, 1955
G. E. WAGNER
2,713,499
LOAD BINDER CONSTRUCTION
Filed Jan. 12, 1954
2 Sheets-Sheet 2
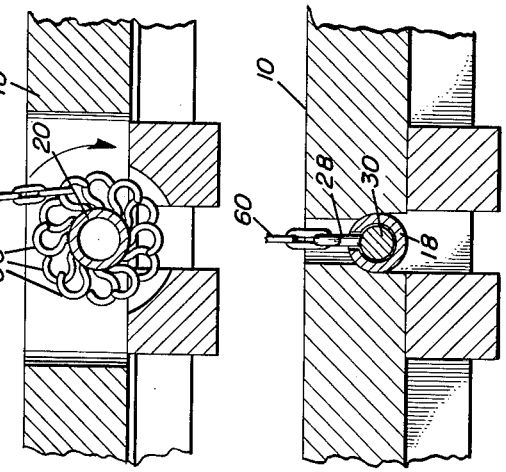
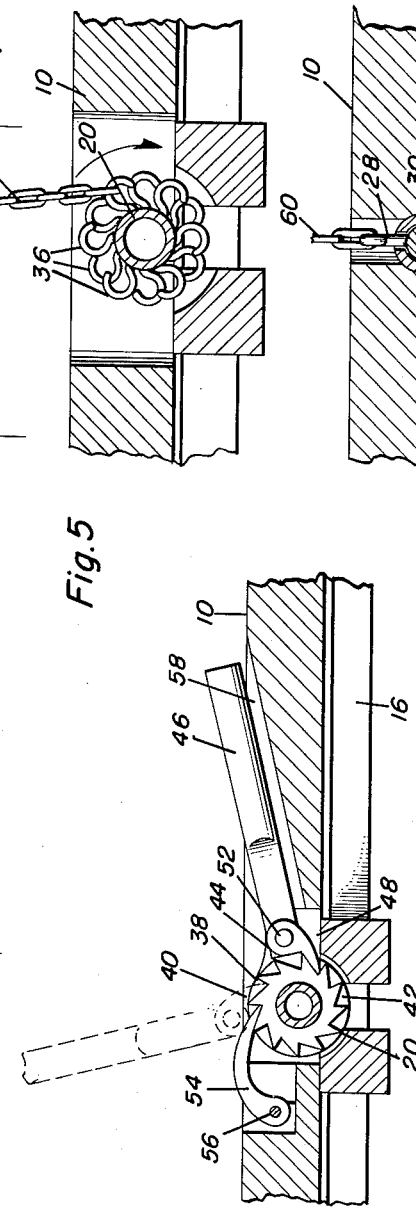
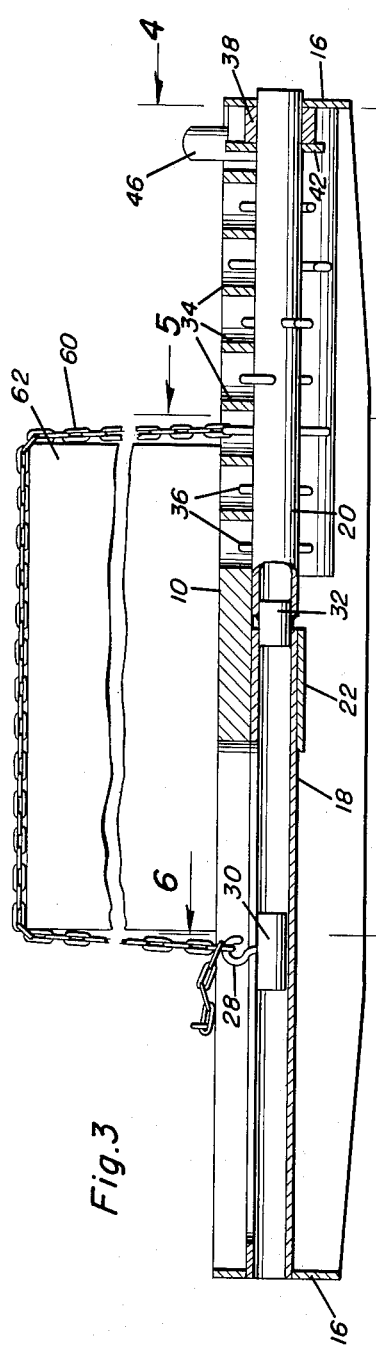
George E. Wagner
INVENTOR.
BY *Clarence A. O'Brien*
and *Harvey B. Jacobson*
Attorneys

United States Patent Office 2,713,499
Patented July 19, 1955

2,713,499

LOAD BINDER CONSTRUCTION

George E. Wagner, Hanging Rock, Ohio, assignor of fifty per cent to Carl Moritz, Ironton, Ohio Application January 12, 1954, Serial No. 403,614

7 Claims. (Cl. 280—179)

This invention relates generally to special construction of vehicle bodies and pertains more particularly to a load binder attachment therefor.

A primary object of this invention is to provide an improved form of load binder construction wherein a vehicle body is provided with a pair of tubular members disposed transversely thereof in end-to-end relation, the body being provided with an elongated slot in one side thereof and a plurality of apertures on the opposite side, one of the tubular members being provided with an elongated slot in register with the elongated aperture in the body and receiving an anchoring block having a hook member projecting therethrough, the other tubular member being provided with a plurality of spaced hook members in register with the spaced apertures in the body and being rotatably mounted such that the opposite ends of a flexible element may be secured to the anchoring block and to the other tubular member, the other tubular member being rotatable for binding a load on the body.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of a vehicle body constructed in accordance with this invention;

Figure 2 is a side elevational view of a vehicle body showing the manner in which its load is fastened thereon;

Figure 3 is an enlarged transverse vertical section taken substantially along the plane of section line 3—3 in Figure 1;

Figure 4 is a vertical section taken substantially along the plane of section line 4—4 in Figure 3;

Figure 5 is another vertical section taken substantially along the plane of section line 5—5 in Figure 3; and Figure 6 is still another vertical section taken substantially along the plane of section line 6—6 in Figure 3.

Referring now more particularly to the drawings, reference numeral 10 indicates the bed of a trailer body which is conventionally connected at its forward end to a tractor unit 12 and which is provided with rear supporting wheels 14, it being understood that the invention is not necessarily restricted to this specific type of vehicle body. At opposite sides of the vehicle body are provided the depending side plate members 16. Disposed longitudinally of the body and extending transversely thereof are any desired number of pairs of tubular members 18 and 20 disposed in end-to-end relation, as shown most clearly in Figure 3. One tubular member 18 is rigidly affixed at its outer end to one of the depending side plates 16 and is rigidly secured at its inner end to a supporting strap member 22 connected to the undersurface of the bed 10. The bed is provided with an elongated opening 24 and the upper surface of the tubular member 18 is provided with an elongated slot 26 in register therewith through which a hook member 28 projects, the hook member being rigidly secured to an anchoring block 30 slidably disposed within the tubular member 18.

The other tubular member 20 is journaled at its outer end in the other depending side plate 16 and at its inner end is provided with a rigid journal extension 32 projecting within the inner end of the fixed tubular member 18 such that the tubular member 20 is rotatably mounted on the vehicle body. Immediately above the second tubular member 20, the bed 10 is provided with a plurality of longitudinally elongated, transversely spaced apertures 34 and longitudinally spaced hook members 36 are secured to this tubular member, one hook member being provided for each of the apertures 34. As seen most clearly in Figure 5, the hook members 36 are disposed spirally around the tubular member 20.

The outer end of the tubular member 20 is provided with a ratchet wheel 38 rigidly affixed thereto, the wheel being provided with a plurality of teeth 40 in the manner shown. A collar 42 is journaled on the tubular member 20 adjacent the ratchet wheel 38, and this collar has a radial projection 44 to which a rod-like extension 46 is rigidly secured, and it will be noted that an actuating pawl 48 is pivotally secured, as by pin 52, to this projection, the pawl 48 being in engagement with the teeth 40 of the ratchet wheel. A holding pawl 54 is pivotally secured as by pin 56 to the vehicle body bed 10 and is engaged by gravity with the teeth 40 of the ratchet wheel 38, in the manner shown most clearly in Figure 4.

In this manner, by manipulating the extension 46, and consequently the collar 42, between the full and dotted line positions shown in Figure 4, the tubular member 20 will be ratcheted for a purpose presently apparent. For permitting the maximum of oscillation of the ratchet assembly, a portion of the vehicle bed 10 may be notched or cut away, as at 58, it being appreciated that a suitable extension handle such as a pipe may be slipped over the free end of the extension 46.

When it is desired to bind a load on the vehicle body, one end of a flexible element, such as a chain 60, is engaged with one of the hooks 36 on the tubular member 20 adjacent the side of the load 62, and the chain is passed thereover, the anchor block 30 positioned adjacent the load and the chain engaged with the hook 28 in the manner shown most clearly in Figure 3. The ratchet assembly is then manipulated to rotate the tubular member 20 and securely bind the load on the vehicle body bed 10. In this manner, it will be manifest that regardless of the width of the material comprising the load 62, the chain 60 will be securely fastened closely adjacent the opposite sides thereof and will bind the load in such a manner as to preclude lateral shifting thereof when the vehicle is moving. Thus, any width load may be taken care of with a minimum of effort and as effectively as is possible. An important feature is to be noted in conjunction with the positioning of the ratchet assembly for effecting the final binding action of the load inasmuch as it will be appreciated that it is only necessary for the operator to stand up on the truck bed during that time in which he positions the chain assembly 60. Thereafter, he may stand on the ground and manipulate the ratchet mechanism to effect the final binding of the load. In ordinary load binders, it is necessary for the operator to stand on the vehicle bed during the binding action, and as a consequence, numerous accidents occur by reason of the operators slipping and falling from the truck bed and injuring themselves. By the construction shown, this possibility is practically eliminated, as will be readily appreciated.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination with a vehicle body having a bed, a load binder comprising a first tubular member rotatably mounted on said bed transversely of and below the upper surface thereof, said first tubular member extending substantially halfway across said body from one side thereof, a second tubular member rigidly affixed to said bed in end-to-end relation to said first member, said second member being provided with an elongated slot in its upper surface, said bed having an elongated aperture in register with said slot, an anchor block slidably received within said second member, a hook secured to said block and projecting through said slot and elongated aperture, said bed having a plurality of transversely spaced apertures above the first tubular member, a plurality of longitudinally spaced hooks secured to said first member, each in register with one of the spaced apertures, and means operably carried by said body for rotating said first tubular member.

2. The combination of claim 1 wherein said means comprises a ratchet mechanism including a holding pawl pivotally secured to said bed.

3. In combination with a vehicle body having a bed, a load binder comprising a first tubular member rotatably mounted on said bed transversely of and below the upper surface thereof, said first tubular member extending substantially halfway across said body from one side thereof, a second tubular member rigidly affixed to said bed in end-to-end relation to said first member, said second member being provided with an elongated slot in its upper surface, said bed having an elongated aperture in register with said slot, an anchor block slidably received within said second member, a hook secured to said block and projecting through said slot and elongated aperture, said bed having a plurality of transversely spaced apertures above the first tubular member, a plurality of longitudinally spaced hooks secured to said first member, each in register with one of the spaced apertures, and means operably carried on said body for rotating said first tubular member, said means comprising a ratchet mechanism including a collar journaled on said first member, a ratchet wheel fixed to said first member adjacent said collar, an operating pawl on said collar engaging said ratchet wheel, a holding pawl pivotally mounted on said bed in engagement with said wheel, and a handle for oscillating said collar.

4. The combination of claim 3 wherein the hooks on said first member are disposed spirally thereof.

5. The combination of claim 1 wherein the inner end of said first member includes an integral portion journaled within the corresponding end of said second member.

6. The combination of claim 3 wherein the inner end of said first member includes an integral portion journaled within the corresponding end of said second member.

7. In combination with a vehicle body having a bed, a load binder comprising a first tubular member rotatably mounted on said bed transversely of and below the upper surface thereof, said first tubular member extending partially across said body from one side thereof, a second tubular member rigidly affixed to said bed in oppositely disposed relation to said first member, said second member being provided with an elongated slot in its upper surface, said bed having an elongated aperture in register with said slot, means slidably received within said second member, fastening means secured to said last mentioned means and projecting through said slot and elongated aperture for engagement with a flexible load engaging element, said bed having transversely spaced aperture means above the first tubular member, longitudinally spaced fastening means secured to said first member for engagement with said flexible load engaging element, said last mentioned fastening means being in register with the transversely spaced aperture means above the first tubular member, and means operably carried by said body for rotating said first tubular member.

References Cited in the file of this patent
UNITED STATES PATENTS

| | | |
|---|---|---|
| 772,157 | Koehler | Oct. 11, 1904 |
| 1,428,706 | Prichard | Sept. 12, 1922 |